United States Patent Office 3,277,099
Patented Oct. 4, 1966

3,277,099
PRODUCTION OF OPEN-CHAIN OLIGOMERS
OF 1,3-DIENES
Hubertus Seibt, Ludwigshafen (Rhine), and Nikolaus von Kutepow, Karlsruhe-Rueppurr, Germany, assignors to Badische Anilin- & Soda-Fabrik Aktiengesellschaft, Ludwigshafen (Rhine), Germany
No Drawing. Filed July 26, 1963, Ser. No. 297,938
Claims priority, application Germany, July 28, 1962, B 68,224
7 Claims. (Cl. 260—666)

This invention relates to a new process for the production of open-chain oligomers of 1,3-dienes. More specifically, the invention relates to a new process for the production of open-chain dimers of open-chain 1,3-dienes.

A number of methods have become known by which 1,3-dienes may be converted catalytically into oligomers. As a rule cyclic compounds are obtained, for example cyclooctadiene-(1,5) and/or cyclododecatriene-(1,5,9) from butadiene-(1,3) (hereinafter referred to briefly as butadiene). Methods have however also become known by which open-chain oligomers may be prepared. Thus it is known that open-chain oligomers are obtained from 2,3-dimethylbutadiene-(1,3) by means of a catalyst which has been formed from a titanium halide or chromium halide and an organoaluminum compound (British patent specification No. 837,267). According to Belgian patent specification No. 598,363, open-chain oligomers are obtained from other 1,3-dienes by using a catalyst which has been formed from a cobalt compound, or preferably an iron compound, and a reducing agent in the presence of an electron donor. In this way 3-methylheptatriene-(1,4,6) is obtained from butadiene, although only in moderate yields and with relatively low conversions.

It is an object of the present invention to provide a process by which open-chain oligomers of open-chain 1,3-dienes are obtained by means of a catalyst not hitherto used for the purpose. Another object of the invention is to provide a process by which linear octatrienes are obtained from butadiene. It is a further object of the invention to provide a process by which definite octatrienes can be obtained as preferential products of the dimerization of butadiene by variation of the catalyst. Other objects and advantages of the invention will be evident from the following description.

In accordance with this invention, the said objects and advantages are achieved by oligomerization of 1,3-dienes by means of a conventional catalyst containing zero-valent nickel and a compound of trivalent phosphorus, arsenic or antimony in the presence of a non-aromatic organic hydroxyl compound, the said hydroxyl compound being used in at least a molar amount with reference to the nickel.

According to the new process, the initial materials can be converted in high yields into oligomers which are mainly open-chain compounds. It is noteworthy that the reaction can be controlled so that open-chain dimers are the main products. For example octatrienes are preferentially formed from butadiene. 3-methylheptatriene-(1,4,6), which is obtainable according to the said Belgian patent specification No. 598,363, is however not obtained in appreciable amounts. Nickel catalysts evidently tend to produce unbranched oligomers under the process conditions.

The preferred 1,3-diene is butadiene. Other suitable 1,3-dienes are butadiene derivatives having the general formula $CHR^1=CR^2-CR^3=CHR^4$ in which $R^1$, $R^2$, $R^3$ and $R^4$ denote a hydrogen atom or a methyl group or ethyl group and at least two of them denote hydrogen atoms. Specific examples are isoprene, 2,3-dimethylbutadiene-(1,3), 2-ethylbutadiene-(1,3), pentadiene-(1,3) and hexadiene-(2,4).

The present invention does not lie in the catalysts used. The nickel catalysts used are those known as oligomerization catalysts, namely complex compounds of zero-valent nickel which contain at least one compound of trivalent phosphorus, arsenic or antimony as electron donor. Examples of these electron donors are organic phosphines and phosphine oxides, esters of phosphorous and thiophosphorous acids, organic phosphorous acid triamines, organic arsines, stibines and bismuthines, esters of arsenious and antimonious acids. Examples of specific electron donors of this type are triethylphosphine, tributylphosphine, triphenylphosphine, tri-o-tolylphosphine, tri-p-biphenylylphosphine, tri-o-biphenylylphosphine, tri-n-dodecylphosphine, triethyl phosphite, tri-n-butyl phosphite, triphenyl phosphite, tri-o-tolyl phosphite, trithymyl phosphite, phosphorous acid trimorpholide, triphenyl thiophosphite, tri-o-methoxyphenylphosphine, phenyl-diphenoxyphosphine, triethylarsine, tributylarsine, triphenylarsine, tripropylstibine, triphenylstibine and triethylbismuthine.

It is remarkable that it is possible by the selection of the electron donor to direct the reaction toward the formation of specific isomers. Thus for example from butadiene, mainly octatriene-(1,3,6) is obtained with phosphites, such as triethylphosphite as electron donors, mainly octatriene-(1,3,7) with phosphines, such as tributylphosphine, and mainly octatriene-(2,4,6) with phosphorous acid triamides, such as phosphorous acid trimorpholide.

It is possible to start from preformed nickel(O) complexes. It is also possible however to prepare the complexes within the reaction mixture and to use them without previous separation.

Suitable preformed nickel complexes are described for example in U.S. patent specification No. 2,686,209. These are compounds having the general formula $$[(RO)_3P]_xNi(CO)_{4-x}$$

or $[R_3P]_xNi(CO)_{4-x}$ in which R denotes an alkyl radical, aryl radical or another organic radical and $x$ denotes 1, 2 or 3. These catalysts are obtainable by the action of phosphites or phosphines on nickel tetracarbonyl. Catalysts which contain the equivalent arsenic or antimony compounds instead of the phosphorous ligands (Belgian patent specification No. 607,397 and U.S. patent specification No. 2,991,317) may also be used for the present process.

Other suitable catalysts have the formula $Ni(PR_3)_xZ_y$, in which R denotes an alkyl, aryl, aralkyl, alkoxy, aryloxy, aralkoxy radical or the radical of a secondary amine or halogen atom, Z denotes an unsaturated hydrocarbon having one or more olefinic or acetylenic linkages or an α,β-olefinically unsaturated aldehyde or an α,β-olefinically unsaturated nitrile, $x$ denotes a whole number from 1 to 4, $y$ denotes zero, 1 or 2 and the total of $x$ and $y$ may be 2, 3 or 4. Such compounds may be prepared for example by the action of phosphites, phosphines or phosphorous acid triamides on compounds having the formula NiZ, for example cyclododecatriene-(1,5,9)-nickel(O) or $NiZ_2$, for example nickel bisacrylonitrile.

It is also possible to work with catalysts which have been formed from a nickel compound, an organometallic compound, a metal hydride or a metal as reducing agent and one or more of the said electron donors (see for example Belgian patent specification No. 598,363, and U.S. patent application Serial No. 137,964, filed September 14, 1961, by Herbert Mueller).

If the catalyst is produced within the reaction mixture (from nickel(O) compounds by displacement or from nickelous compounds by reduction in the presence of an electron donor), the electron donor is used advantageously in the molar ratio 0.5 to 1 to 4:1, preferably 1:1 to 2:1, with reference to nickel.

Catalysts which are particularly preferred are those which contain on the one hand at least one phosphine, phosphite, organic phosphorous acid triamide derivative or an equivalent arsenic or antimony compound as the electron donor and on the other hand at least one compound containing one or more olefinic or acetylenic linkages in the molecule. Such compounds may be obtained for example by reduction of nickelous compounds in the presence of the electron donor and in the presence of an unsaturated compound of the said type, preferably the 1,3-diene to be oligomerized.

The following are examples of suitable nickel catalysts;

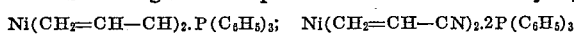

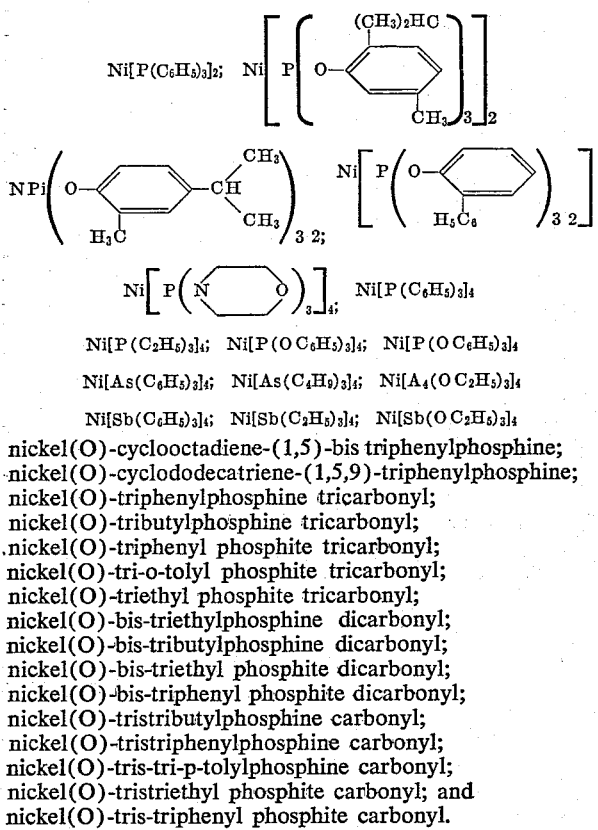

$Ni[P(C_2H_5)_3]_4$; $Ni[P(OC_6H_5)_3]_4$; $Ni[P(OC_6H_5)_3]_4$ $Ni[As(C_6H_5)_3]_4$; $Ni[As(C_4H_9)_3]_4$; $Ni[A_4(OC_2H_5)_3]_4$ $Ni[Sb(C_6H_5)_3]_4$; $Ni[Sb(C_2H_5)_3]_4$; $Ni[Sb(OC_2H_5)_3]_4$ nickel(O)-cyclooctadiene-(1,5)-bis triphenylphosphine;
nickel(O)-cyclododecatriene-(1,5,9)-triphenylphosphine;
nickel(O)-triphenylphosphine tricarbonyl;
nickel(O)-tributylphosphine tricarbonyl;
nickel(O)-triphenyl phosphite tricarbonyl;
nickel(O)-tri-o-tolyl phosphite tricarbonyl;
nickel(O)-triethyl phosphite tricarbonyl;
nickel(O)-bis-triethylphosphine dicarbonyl;
nickel(O)-bis-tributylphosphine dicarbonyl;
nickel(O)-bis-triethyl phosphite dicarbonyl;
nickel(O)-bis-triphenyl phosphite dicarbonyl;
nickel(O)-tristributylphosphine carbonyl;
nickel(O)-tristriphenylphosphine carbonyl;
nickel(O)-tris-tri-p-tolylphosphine carbonyl;
nickel(O)-tristriethyl phosphite carbonyl; and
nickel(O)-tris-triphenyl phosphite carbonyl.

It is only necessary to use the nickel catalysts in small amounts. Generally 0.001 to 1% by weight, calculated as nickel and with reference to the 1,3-diene, is used.

It is an essential feature of the process according to this invention that the reaction is carried out in the presence of a non-aromatic hydroxyl compound. In the present specification "non-aromatic hydroxyl compound" means a compound which contains a hydroxyl group which is attached to an aliphatic or cycloaliphatic carbon atom. Under this definition, benzyl alcohol for example is to be regarded as a non-aromatic hydroxyl compound although strictly speaking it is an aliphatic alcohol which contains an aromatic radical. Preferred non-aromatic hydroxyl compounds have one to fifteen, particularly one to four, carbon atoms and, apart from the hydroxyl group, have saturated hydrocarbon structure or bear additional substituents which are inert under the conditions of the process, such as alkoxy groups having one to four carbon atoms. Especially good results are obtained by using primary alcohols, i.e., compounds having a $CH_2OH$- group.

Examples of suitable non-aromatic hydroxyl compounds are: methanol, ethanol, n-propanol, isopropanol, n-butanol, isobutanol, secondary butanol, tertiary butanol, crotyl alcohol, cyclohexyl carbinol, cyclohexanol, cyclooctanol, benzyl alcohol, β-phenylethyl alcohol, lauryl alcohol, methyl glycol (2-methoxy-ethanol), butyl glycol (2-butoxy-ethanol), and cinnamyl alcohol.

The non-aromatic hydroxyl compound is used in at least a molar amount with reference to the nickel. It is advantageous however to use an excess, for example two to five moles of the hydroxyl compound per atom of nickel in complex combination. The greater the excess, the more is the formation of cyclic oligomers suppressed. It is therefore advantageous to use the hydroxyl compound at the same time as a solvent for the catalyst, 1,3-diene and reaction product. It is also possible however to coemploy inert solvents. Examples of suitable inert solvents are aliphatic, cycloaliphatic and aromatic hydrocarbons, such as n-hexane, n-octane, gasoline fractions, cyclohexane, tetrahydronaphthalene, decahydronaphthalene, benzene, toluene, xylene, tetrahydrofuran and similar compounds.

It is advantageous to carry out the oligomerization in the presence of small amounts of polymerization inhibitors which suppress the formation of high molecular weight linear or branched polymers of 1,3-dienes. Phenolic compounds, such as hydroquinone or tertiary butylpyrocatechol, are especially suitable for this purpose, and also amines such as N,N'-diisopropylphenylene diamine. The polymerization inhibitors are advantageously added in amounts of 0.001 to 0.5% by weight with reference to the 1,3-diene.

The process according to the invention is generally carried out at a temperature between 0° and 250° C., preferably between 40° and 150° C. It is usual to work either at atmospheric pressure or preferably at superatmospheric pressure, for example up to 20 atmospheres gauge. Pressures of this order are often spontaneously set up at the reaction temperature.

The process according to this invention may be carried out for example by introducing the dissolved or suspended catalyst into an autoclave while excluding air and supplying the liquid 1,3-diene thereto. The autoclave is then heated with agitation to the reaction temperature, the pressure which corresponds to the reaction temperature thereby being set up. It is also possible to pass the 1,3-diene, for example gaseous butadiene, into a solution or suspension of the catalyst at atmospheric pressure.

The process may be carried out continuously either by passing the gaseous reactants through the liquid phase from the bottom or by allowing the liquid phase to trickle down a packed tower counter-current to the gaseous reactants.

The reaction mixture is most simply worked up by distilling off the liquid constituents, advantageously in a film evaporator. The readily volatile constituents are then fractionally distilled.

Oligomers obtainable according to this invention are valuable monomers for the production of copolymers and also as intermediates for further reactions. For example, like all the usual 1,3-dienes, they may be reacted with maleic anhydride. The dicarboxylic acid anhydride thus formed may be reacted with alcohols to form the corresponding diesters which may be used as plasticizers. The latter may be mixed with polyvinyl chloride in quantities of about 20 to 35% by weight, mixtures capable of being processed into sheeting being obtained.

The invention will be further illustrated by the following examples in which the parts specified are parts by weight, except when otherwise stated. Parts by weight bear the same relation to parts by volume as the kilogram to the liter (S.T.P.).

*Example 1*

2 parts of nickel(O)-bis-acrylonitrile and 4 parts of triethyl phosphite are stirred in 300 parts by volume of absolute ethanol in a stirrer vessel for two hours at 70° C. while excluding air. The yellow brown solution is transferred under nitrogen to an autoclave having stirring means and having a capacity of 3000 parts by volume.

600 parts of liquid butadiene is then forced in. The mixture is heated for eighteen hours at 70° C. and then cooled. 823 parts of a green yellow solution is obtained. 782 parts of distillate having a boiling point of 25° to 160° C. at 20 mm. Hg can be separated from this solution in a film evaporator. 9 parts of non-volatile reaction products and also the catalyst remain in the residue.

The distillate is shaken twice with water and the organic layer is dried with calcium chloride and distilled under subatmospheric pressure. 404 parts of distillate having a boiling point of 44° to 80° C. at 70 mm. Hg is obtained, the bulk of it passing over at 62° C. According to analysis by gas chromatography, the product has the following composition:

341 parts (84.5%) of octatriene-(1,3,6),
29 parts (7%) of octatriene-(1,3,7),
4.4 parts (1.1%) of vinylcyclohexene-(3),
3.2 parts (0.8%) of cyclooctadiene-(1,5) and other volatile butadiene oligomers.

Octatriene-(1,3,6) may be obtained in a form which is pure by gas chromatography by fractional distillation over an efficient column. It has the boiling point 130° to 131° C. at 760 mm. Hg and 71° to 72° C. at 100 mm. Hg;

$$d_{20} = 0.7670 \text{ g./ccm.}$$
$$n_D^{25} = 1.4712$$
$$n_D^{20} = 1.4738$$

479 parts (80%) of the butadiene used has reacted. The yields of the individual reaction products, with reference to butadiene reacted, are as follows:

| | Percent |
|---|---|
| Octatriene-(1,3,6) | 71.6 |
| Octatriene-(1,3,7) | 6.0 |
| Other octatrienes | 1.5 |
| Vinylcyclohexene-(3) | 0.9 |
| Low boiling point dimers | 3.1 |
| High boiling oligomers such as cyclooctadiene-(1,5), cyclododecatriene-(1,5,9), etc. | 14.4 |
| Non-volatile compounds | 1.9 |

*Example 2*

6 parts of nickel(O)-bis-acrylonitrile, 14.7 parts of tributylphosphine and 300 parts by volume of ethanol are stirred for three hours at 70° C. with exclusion of air. 600 parts of butadiene is reacted at 70° C. by means of the resultant red brown solution, as described in Example 1. After a reaction period of eighteen hours, 865 parts of a dark brown reaction mixture is obtained which is worked up as in Example 1. Conversion is 100% and the following products are obtained in the following yields:

| | Percent |
|---|---|
| Octatriene-(1,3,7) | 63.6 |
| Octatriene-(1,3,6) | 1.7 |
| Other octatrienes | 4.1 |
| 1-vinyl-3-methylenecyclopentane | 2.9 |
| Trimers and tetramers of butadiene having the boiling point 62° to 120° C. at 20 mm. Hg | 20.8 |
| Non-volatile compounds | 5.7 |

The bulk of the octatriene-(1,3,7) is obtained in pure form by fractional distillation over an efficient column; boiling point 67° C. at 100 mm. Hg; $n_D^{25} = 1.4652$.

*Example 3*

6 parts of nickel(O)-bis-acrylonitrile, 17.4 parts of trithymyl phosphite and 300 parts by volume of absolute ethanol are heated with stirring for two hours at 70° C. in a vessel provided with stirring means, air being excluded. 620 parts of gaseous butadiene is then passed in, the temperature being 60° C. A pressure of 6 atmospheres gauge is thus set up and this declines to atmospheric pressure after sixteen hours. After a reaction period of twenty-four hours, the vessel is emptied and 834 parts of a yellow green liquid reaction mixture is obtained. Further procedure is as described in Example 1. Conversion is 98.3% and the following products are obtained in the following yields:

| | Percent |
|---|---|
| Octatriene-(1,3,6) | 36.8 |
| Octatriene-(1,3,7) | 22.5 |
| 1-vinyl-3-methylenecyclopentane | 3.8 |
| Vinylcyclohexene-(3) | 0.3 |
| Other dimers | 7.0 |
| Cyclooctadiene-(1,5) | 5.0 |
| High boiling trimers and tetramers of butadiene | 13.0 |
| Non-volatile compounds | 10.4 |

*Example 4*

The catalyst is prepared from 6 parts of nickel(O)-bis-acrylonitrile, 10.4 parts of phosphorous acid trimorpholide and 300 parts by volume of absolute ethanol, and 620 parts of liquid butadiene (added all at once at the beginning) is reacted at 70° C. within thirty-six hours. 853 parts of reaction product is obtained which is worked up as in Example 1. Conversion is 93% and the following products are obtained in the following yields (with reference to reacted butadiene):

| | Percent |
|---|---|
| Octatriene-(2,4,6) | 24.5 |
| Octatriene-(1,3,6) | 9.8 |
| Octatriene-(1,3,7) | 2.0 |
| 1-vinyl-3-methylenecyclopentane | 3.4 |
| Vinylcyclohexene-(3) | 1.3 |
| Cyclooctadiene-(1,5) | 1.8 |
| High boiling oligomers | 44.6 |
| Non-volatile compounds | 11.0 |

The high boiling oligomers are trimers and tetramers of butadienene, including a compound having the boiling point 83° to 85° C. at 0.15 mm. Hg; $n_D^{25} = 1.5018$; hydrogenation iodine number 480; molecular weight 208.

*Example 5*

The catalyst is prepared from 3 parts of nickel(O)-bis-acrylonitrile, 8.7 parts of trithymyl phosphite and 150 parts of n-propanol by stirring the mixture for an hour at 70° C. 6 parts of sodium methylate is added to the solution and the whole mixture is transferred to a vessel having a capacity of 1000 parts by volume and fitted with stirring means, the transfer being effected while excluding air. 200 parts of liquid butadiene is then forced in and the mixture is kept at 70° C. for eighteen hours. The reaction mixture amounts to 290 parts and is worked up as described in Example 1. The following substances are obtained in the following yields with reference to reacted butadiene (63%):

| | Percent |
|---|---|
| Octatriene-(1,3,6) | 46.0 |
| Octatriene-(1,3,7) | 26.0 |
| 1-vinyl-3-methylenecyclopentane | 2.8 |
| Other octatrienes | 10.7 |
| Vinylcyclohexene-(3) | 1.0 |
| Cyclooctadiene-(1,5) | 1.2 |
| High boiling oligomers | 5.7 |
| Non-volatile compounds | 6.8 |

A similar result is achieved when an equal amount of methyl glycol, i.e. 2-methoxy-ethanol, is used instead of propanol.

*Example 6*

A mixture of 6 parts of nickel(O)-bis-acrylonitrile, 34.8 parts of trithymyl phosphite and 300 parts by volume of tertiary butanol is stirred while excluding air for three and a half hours at 70° C. The light yellow solution formed is transferred with exclusion of air to an autoclave having stirring means and having a capacity of 3000 parts by volume. 600 parts of butadiene is added and the mixture kept at 70° C. for forty-eight hours. 830 parts of reaction mixture are obtained which is worked up as in Example 1. Conversion is 76.9%. The following substances are obtained in the following yields with reference to reacted butadiene:

| | Percent |
|---|---|
| Octatriene-(1,3,6) | 26.6 |
| Octatriene-(1,3,7) | 0.1 |
| Vinylcyclohexene-(3) | 4.7 |
| Cyclooctadiene-(1,5) | 44.6 |
| Cyclododecatriene-(1,5,9) | 3.5 |
| High boiling oligomers | 14.7 |
| Non-volatile compounds | 4.0 |

*Example 7*

3 parts of nickel(O)-bis-acrylonitrile, 12.8 parts of tri-o-tolyl phosphite, 150 parts of absolute ethanol and 300 parts of liquid butadiene are introduced while excluding air into a stirrer vessel having a capacity of 1000 parts by volume. The mixture is heated at 60° C. for forty-eight hours. The reaction mixture, 454.5 parts, is worked up as in Example 1 and the following substances are obtained in the following yields with reference to reacted butadiene (93.3%):

| | Percent |
|---|---|
| Octatriene-(1,3,7) | 35.8 |
| Octatriene-(1,3,6) | 17.9 |
| 1-vinyl-3-methylenecyclopentane | 12.1 |
| Vinylcyclohexene-(3) | 1.4 |
| Cyclooctadiene-(1,5) | 2.4 |
| High boiling oligomers | 26.7 |
| Non-volatile compounds | 0 |

*Example 8*

6 parts of nickel(O)-bis-acrylonitrile, 34.8 parts of trithymyl phosphite and 300 parts by volume of absolute ethanol are stirred for some hours at 70° C. with exclusion of air. 600 parts of crude butadiene (44.6% of butadiene, 38.1% of butene-(1) and isobutene, 13.4% of butene-(2) and the remainder butane) are reacted in the way described in Example 1. After eighteen hours, 845 parts of reaction mixture are obtained from which the inert $C_4$-hydrocarbons are removed by degassing. The 635 parts of reaction product which remains is worked up as described in Example 1. Conversion is 92.6%. The following substances are obtained in the following yields with reference to reacted butadiene:

| | Percent |
|---|---|
| Octatriene-(1,3,6) | 20.0 |
| Octatriene-(1,3,7) | 18.1 |
| 1-vinyl-3-methylenecyclopentane | 2.0 |
| Vinylcyclohexene-(3) | 2.5 |
| Cyclooctadiene-(1.5) | 21.8 |
| High boiling oligomers | 24.2 |
| Non-volatile compounds | 5.3 |

*Example 9*

6 parts of nickel(O)-bis-acrylonitrile, 34.8 parts of trithymyl phosphite and 300 parts by volume of 2-ethylhexanol-(1) are heated at 70° C. for four hours while excluding air. 600 parts of liquid butadiene are reacted with the resultant red brown solution as described in Example 1. After the whole has been heated at 70° C. for forty-eight hours, 870.5 parts of reaction product are obtained which is worked up as described in Example 1. Butadiene conversion is 82.4%. The following products are obtained in the following yields with reference to reacted butadiene:

| | Percent |
|---|---|
| Octatriene-(1,3,6) | 25.1 |
| Octatriene-(1,3,7) | 0.5 |
| Vinylcyclohexene-(3) | 3.9 |
| Low boiling dimers | 10.8 |
| Cyclooctadiene-(1,5) | 51.5 |
| High boiling oligomers | 2.8 |
| Non-volatile compounds | 5.4 |

*Example 10*

20 parts of bis-(trithymyl phosphite)-nickel(O), 300 parts by volume of absolute ethanol and 600 parts of butadiene are heated for forty-eight hours while stirring and excluding air in an autoclave having a capacity of 3000 parts by volume. 829 parts of reaction mixture are obtained. By distillation, 806 parts of distillate having a boiling point of 22° to 175° C. at 25 mm. Hg are obtained and 21 parts of distillation residue. Further procedure is as described in Example 1. Butadiene conversion is 89%. The following substances are obtained in the following yields with reference to reacted butadiene:

| | Percent |
|---|---|
| Octatrienes | 69.5 |
| Vinylcyclohexene-(3) | 4.8 |
| Cyclooctadiene-(1,5) | 8.7 |
| High boiling oligomers | 16.8 |
| Non-volatile compounds | 0.2 |

*Example 11*

10 parts of bis-(tri-o-tolyl phosphite)-acrylonitrile-nickel(O), 0.2 part of tertiary butylpyrocatechol, 150 parts by volume of absolute ethanol and 300 parts of liquid butadiene are introduced while excluding air into a vessel having a capacity of 1000 parts by volume which is fitted with a stirrer. The mixture is heated for twenty-four hours at 60° C. and 343 parts of reaction product is obtained. After the unreacted butadiene has been expelled from the reaction product, the latter is worked up as described in Example 10. The butadiene conversion is 32.3%. The following substances are obtained in the following yields with reference to reacted butadiene:

| | Percent |
|---|---|
| Octatrienes | 85.0 |
| Vinylcyclohexene-(3) | 8.0 |
| Cyclooctadiene-(1,5) | 1.9 |
| High boiling oligomers | 5.1 |
| Non-volatile compounds | 0 |

A similar result is obtained when the same amount of triphenyl-phosphine-cyclooctadiene - (1,5) - nickel(O) is used instead of bis-(tri-o-tolyl phosphite)-acrylonitrile-nickel(O).

*Example 12*

A suspension of 10 parts of triphenylphosphine nickel tricarbonyl in 300 parts by volume of absolute ethanol is introduced into an autoclave having a capacity of 3000 parts by volume. 600 parts of liquid butadiene is forced in and the mixture heated with stirring at 80° C. for eighteen hours. After expelling the unreacted butadiene from the reaction product, 701 parts of a dark green liquid is obtained having a black sediment. Distillation of the liquid phase gives 483 parts of distillate having a boiling point of 27° to 125° C. at 25 mm. Hg. The butadiene conversion is 50%. The following substances are obtained in the following yields with reference to reacted butadiene:

| | Percent |
|---|---|
| Octatrienes (octatriene - (1,3,6):octatriene - (1,3,7) 10:1) | 76.0 |
| 1-vinylcyclohexene-(3) | 9.5 |
| Cyclooctadiene-(1,5) | 1.6 |
| Cyclododecatriene-(1,5,9) | 3.5 |
| Non-volatile compounds | 7.0 |

Similar results are obtained when 8 parts of bis-triphenyl phosphite nickel(O) dicarbonyl is used as catalyst under otherwise the same conditions.

*Example 13*

1.5 parts of triphenylphosphine nickel tricarbonyl, 40 parts by volume of methanol and 41 parts of liquid butadiene are introduced into an autoclave of 250 parts by volume capacity. The mixture is heated for eighteen hours at 80° C. Conversion is 97%. By conventional working up of the reaction product, the following substances are obtained in the following yields with reference to butadiene reacted:

| | Percent |
|---|---|
| Octatriene-(1,3,6) trans | 71 |
| Octatriene-(1,3,6) cis | 3 |
| 1-vinylcyclohexene-(3) | 3 |
| Dimeric octatrienes | 13 |
| Cyclooctadiene-(1,5) | 2 |
| Non-volatile compounds | 7 |

A similar result is obtained by using the same amount of triphenylarsine nickel tricarbonyl instead of triphenylphosphine nickel tricarbonyl.

Example 14

1 part of nickel(O)-bis-acrylonitrile, 3.6 parts of tributyl antimony and 40 parts by volume of liquid butadiene are heated for twenty-four hours at 90° C. in an autoclave having a capacity of 250 parts by volume. By conventional working up of the reaction product, the following substances are obtained in the following yields with reference to reacted butadiene:

| | Percent |
|---|---|
| Octatrienes | 30.4 |
| 1-vinylcyclohexene-(3) | 28 |
| Cyclooctadiene-(1,5) | 4.3 |
| Non-volatile compounds | 37 |

Example 15

2.6 parts of nickel acetylacetonate and 54 parts of cyclooctadiene-(1,5) are dissolved in a stirrer vessel in 100 parts of benzene free from water and air, and then 2.3 parts of aluminum trialkyl is added with careful exclusion of air. The mixture is stirred for a short period and then 3.3 parts of triethylphosphite is added. After stirring for 10 minutes, 300 parts by volume of absolute ethanol is added to the catalyst solution formed and the whole is transferred to an agitated autoclave. After pumping in 300 parts of liquid butadiene the mixture is heated at 90° C. for twenty-four hours. The reaction mixture is worked up and the following products are obtained in the following yields (with reference to butadiene reacted):

| | Percent |
|---|---|
| Octatriene | 54 |
| Vinylcyclohexene-(3) | 7 |
| Cyclooctadiene-(1,5) | 15 |
| High boiling oligomers | 11 |
| Resins | 13 |

Example 16

2.6 parts of nickel acetylacetonate and 1 part of sodium are intensely stirred for five hours in a stirrer vessel in 100 parts cyclooctadiene-(1,5). The resultant solution is mixed with 3.3 parts triethylphosphite and 300 g. of absolute ethanol and the whole is transferred to an agitated autoclave. 300 parts of liquid butadine is pumped in and the mixture heated for twenty-four hours at 90° C. The reaction mixture is worked up and the following products are obtained in the following yields (with reference to butadiene reacted):

| | Percent |
|---|---|
| Octatriene | 45 |
| Vinylcyclohexene-(3) | 5 |
| Cyclooctadiene-(1,5) | 18 |
| High boiling oligomers | 10 |
| Resins | 22 |

Example 17

5.3 parts of nickel carbonyl and 3.2 parts of acrylonitrile are refluxed in 13 parts by volume of benzene with exclusion of air until the evolution of carbon monoxide comes to a standstill. 2,490 parts by volume of carbon monoxide is produced (758 mm. Hg; 25° C.). Accordingly, 25.8 moles of nickel(O)-bis-acryonitrile is formed. 60 parts by volume of absolute ethanol and 9.42 parts of triethyl phosphite are then introduced into the vessel. The mixture is stirred for six hours at 75° C. and discharged into a larger vessel where it is made up with hot alcohol to a total of 210 parts by volume.

0.5 part by volume of this catalyst solution is fed per hour via a metering pump to the actual reactor. The reactor is a heatable loop which has a capacity of 8.5 parts by volume, is provided with a circulating pump and has a coil tube attached to it which has a capacity of 4.6 parts by volume and in which the reaction is completed. The reactor is maintained at a liquid pressure of 20 atmospheres gauge by means of an automatically controlled discharge valve. 1.5 to 2 parts by volume of liquid butadiene is fed per hour to the loop via a metering pump. The temperature is 115° C. The following results are obtained:

| | Feed (at room temperature) | | Butadiene conversion, percent | Percent yield based on butadiene reacted | | | | |
|---|---|---|---|---|---|---|---|---|
| | Butadiene | Catalyst | | Octatriene | Vinyl Cyclohexene | Cyclooctadiene | High boiling oligomers | Resins |
| (a) | 2 | 0.5 | 66 | 64 | 9.4 | 4.7 | 12.7 | 9.2 |
| (b) | 1.5 | 0.5 | 96 | 50 | 5.1 | 3.3 | 17.6 | 24 |

The average residence period is 5.2 hours in (a) and 6.5 hours in (b). The space-time yield of octatriene per part by volume of reaction space per day is 0.96 in (a) and 0.82 in (b).

Example 18

394 parts of maleic anhydride is dissolved in 700 parts by volume of benzene. 540 parts of octatriene-(1,3,6) is added to this solution at 90° C. with stirring, the heat of reaction being sufficient to keep the mixture at reflux temperature. The reaction is allowed to continue for another hour and the insoluble portions are decanted. The solvent and unreacted octatriene are removed at 70° C. at 5 mm. Hg and the crystalline residue which remains (750 parts) is heated for two hours at 100° C. in a high vacuum. The resultant crystalline diene adduct melts at 61° C.

| | Percent | | | Molecular Weight | Hydrogenation Number | Iodine Number |
|---|---|---|---|---|---|---|
| | C | H | O | | | |
| Found | 69.3 | 6.9 | 23.7 | 212 | 494 | 228 |
| Calculated: $C_{12}H_{14}O_3$ | 69.88 | 6.84 | 23.3 | 206.23 | 492 | 246 |

Example 19

50 parts of the maleic anhydride-octatriene-(1,3,6) adduct is dissolved at 70° C. in 200 parts by volume of n-butanol. After adding 2 parts by volume of 2 N aqueous hydrochloric acid the mixture is heated at 80° C. for three hours while stirring. 170 parts by volume of n-butanol is removed from the clear honey-yellow reaction solution at 32 to 45° C. (10 mm.). 70 parts of di-n-butyl ester of the formula

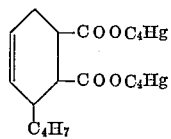

remains as a yellow oily distillation residue.

We claim:

1. In a process for the production of open-chain dimers of open-chain 1,3-dienes by catalytic dimerization of said 1,3-dienes in the presence of catalysts containing zero-valent nickel and a member selected from the group consisting of compounds of trivalent phosphorus, arsenic and antimony, the improvement which comprises carrying out the reaction in contact with an organic hydroxyl compound which bears the hydroxyl group attached to an aliphatic or cycloaliphatic carbon atom of a saturated hydrocarbon structure in at least a molar quantity with reference to nickel.

2. An improved process as claimed in claim 1, wherein the non-aromatic organic hydroxyl compound is a member selected from the group consisting of aliphatic, cycloaliphatic and araliphatic alcohols having one to fifteen carbon atoms and having, apart from the hydroxyl group, saturated hydrocarbon structure and further consisting of the said alcohols substituted by alkoxy having one to four carbon atoms.

3. An improved process as claimed in claim 1 wherein the said non-aromatic organic hydroxyl compound is used as a solvent.

4. An improved process as claimed in claim 1 in which the 1,3-diene is butadiene.

5. An improved process as claimed in claim 1 carried out in contact with a polymerization inhibitor.

6. An improved process as claimed in claim 1 carried out at a temperature between 0° and 250° C.

7. An improved process as claimed in claim 1 carried out at a temperature between 40° and 150° C.

References Cited by the Examiner

FOREIGN PATENTS 1,295,072 4/1962 France.
1,300,595 6/1962 France.
1,329,122 4/1963 France.
1,140,569 12/1962 Germany.

DELBERT E. GANTZ, *Primary Examiner.*

V. O'KEEFE, *Assistant Examiner.*

UNITED STATES PATENT OFFICE
CERTIFICATE OF CORRECTION

Patent No. 3,277,099　　　　　　　　　　　　October 4, 1966

Hubertus Seibt et al.

It is hereby certified that error appears in the above numbered patent requiring correction and that the said Letters Patent should read as corrected below.

Column 2, line 10, for "triamines" read -- triamides --; column 3, line 23, for "NPi" read -- NiP --; column 3, line 32, in the formula, for "$A_4$" read -- As --; column 9, line 67, for "butadine" read -- butadiene --; column 10, line 10, for "acrynotrile" read -- acrylonitrile --.

Signed and sealed this 5th day of September 1967.

(SEAL)
Attest:

ERNEST W. SWIDER　　　　　　　　　　　　　EDWARD J. BRENNER
Attesting Officer　　　　　　　　　　　　　Commissioner of Patents